United States Patent [19]

Christiaens

[11] Patent Number: 5,682,129
[45] Date of Patent: Oct. 28, 1997

[54] ELECTRICAL ACTUATOR

[75] Inventor: Alois Eduard Christiaens, Liederkerke, Belgium

[73] Assignee: N.V. Airpax S.A., Brussels, Belgium

[21] Appl. No.: 806,859

[22] Filed: Dec. 9, 1991

Related U.S. Application Data

[63] Continuation of Ser. No. 433,061, Nov. 6, 1989.

[30] Foreign Application Priority Data

Nov. 7, 1988 [NL] Netherlands ............................ 8802720

[51] Int. Cl.$^6$ ..................................................... H01F 7/08
[52] U.S. Cl. ........................................................... 335/272
[58] Field of Search .................................. 335/272, 229; 310/179, 180, 184, 208, 186, 190, 36, 106, 254, 68 B

[56] References Cited

U.S. PATENT DOCUMENTS

| | | | |
|---|---|---|---|
| 1,823,979 | 9/1931 | Jordan | 310/208 |
| 3,091,728 | 5/1963 | Hogan et al. | 318/254 |
| 3,118,138 | 1/1964 | Milas | 335/272 |
| 3,375,512 | 3/1968 | Watkins et al. | 335/272 |
| 3,492,615 | 1/1970 | Watkins | 335/272 |
| 3,735,303 | 5/1973 | Harden | 335/272 |
| 3,848,331 | 11/1974 | Pavlik et al. | 310/44 X |

*Primary Examiner*—Cassandra C. Spyrou
*Assistant Examiner*—Raymond Barrera
*Attorney, Agent, or Firm*—Michael E. Marion

[57] ABSTRACT

An electrical actuator comprises a first actuator body (1) and a second actuator body (3). The first actuator body comprises two diametrically opposed magnetic poles (N) and (S). The second actuator body is made of a soft-magnetic material and comprises three inwardly directed radial teeth (19, 20 and 21). In order to obtain a maximal ratio between the delivered torque and the applied electric power, only two teeth (19 and 21) are provided with exciter coils (29 and 31). In order to minimize detent torques the three teeth are identical to each other and the first actuator body is suitably diametrically magnetized.

4 Claims, 2 Drawing Sheets

ELECTRICAL ACTUATOR

This is a continuation of application Ser. No. 07/433,061, filed Nov. 6, 1989.

BACKGROUND OF THE INVENTION

1. Field of the Invention

The invention relates to an electrical actuator, comprising a first actuator body having two diametrically opposed magnetic poles, a soft-magnetic second actuator body which is coaxial with the first actuator body and which comprises three equidistantly spaced circumferential teeth, and exciter coils. The first actuator body and the second actuator body cooperate with each other via an air gap and are pivotable through a limited angle relative to one another about a pivotal axis.

2. Art Background

An actuator, of the type referred to above, is known from U.S. Pat. No. 4,447,793 (herewith incorporated by reference) and comprises a circularly cylindrical stator surrounding a rotor having a north pole and a south pole, which rotor has two stable positions, depending on the manner in which the exciter coils are energized. The stator comprises a stator body having three stator teeth and three exciter coils, each of the stator teeth carrying a coil. The stator teeth, which extend radially of the rotor, are disposed at angles of 120° relative to one another and have arcuate tooth surfaces, a narrow passage being formed between two adjacent tooth surfaces. Between the tooth surfaces and the poles of the rotor, which is flattened at opposite sides of the poles, an air gap is formed.

A drawback of the prior art actuator is that it is capable of delivering only a comparatively small torque in relation to the electric power applied to the exciter coils. This may give rise to serious problems, in particular, if a large torque is required in combination with small dimensions of the actuator and high ambient temperatures. When a higher electric power is applied dissipation problems may arise and, moreover, local saturation effects may occur in the stator. Another disadvantage of the prior art actuator is that, in order to combat detent torques, the tooth surfaces have such large tangential dimensions that arranging the coils around the teeth during manufacture of the actuator is complicated as a result of the small space available between successive tooth surfaces. A further disadvantage is that the stator body is made up of several parts.

SUMMARY OF THE INVENTION

It is an object of the invention to provide an actuator of the type defined in the opening paragraph, which has a large ratio between the delivered torque and the applied electric power, which is moreover substantially free from detent torques, and which can be of a simple and robust construction.

To this end the invention is characterized in that two, and not more than two, of said three teeth are provided with turns to form the exciter coils, the tooth which is not provided with turns to form the exciter coils being at least substantially identical in shape and dimensions to the two at least substantially identical and similarly shaped teeth provided with said turns.

It can be demonstrated analytically and has been corroborated experimentally that the actuator in accordance with the invention has a substantially more favourable ratio between the delivered torque and the applied electric power than the prior art actuator. An improvement of 30% is attainable. Moreover, it has been found that the actuator in accordance with the invention hardly suffers from detent torques. Both properties render the actuator in accordance with the invention suitable for many uses, for example, in automobiles, inter alia for the controlled actuator of an air-inlet valve in a carburetor. Moreover, a significant advantage of the actuator in accordance with the invention is that the manufacturer can employ the internally rotationally symmetrical toothed actuator body without any further adaptations as a stator body for an electric motor, for example for an electronically commutated d.c.-motor or stepper motor, in which case all the teeth are obviously provided with exciter coils.

It is to be noted that Japanese Patent Application 62-260557 (herewith incorporated by reference) discloses a solenoid comprising a flat U-shaped yoke with coils and a rotor. The yoke comprises two cores which are disposed in line with one another and around which the coils are arranged. The yoke further comprises three stator limbs, two of said limbs being provided with said teeth and the other limb being secured directly to the yoke. The rotor comprises a circularly cylindrical arcuate north-pole face and a corresponding south pole face, between which pole faces gaps are formed. On account of its flat cross-sectionally rectangular and both internally and externally non-rotationally symmetrical construction the known yoke exhibits non-identical magnetic-flux paths, which gives rise to detent torques which are not permissible, at least for specific uses.

A preferred embodiment of the actuator in accordance with the invention, in which the detent torque is further reduced, is characterized in that the first actuator body is at least substantially circularly cylindrical and is diametrically magnetized. In combination with the rotational symmetry of the second actuator body the sinusoidal magnetic field around the first actuator body of this construction assists in minimizing detent torques.

For practical reasons the first actuator body of the actuator in accordance with the invention is preferably constructed as a pivotable body. The second actuator body is then obviously stationary to form the stator body. Since, in the actuator in accordance with the invention only two of the three teeth carry exciter coils, the actuator comprises not more than two pairs of exciter-coil terminals to be connected, for example, to a control circuit.

BRIEF DESCRIPTION OF THE DRAWINGS

The invention will now be described in more detail, by way of example, with reference to the accompanying drawing, in which.

DETAILED DESCRIPTION OF THE PREFERRED EMBODIMENT

Figure 1:
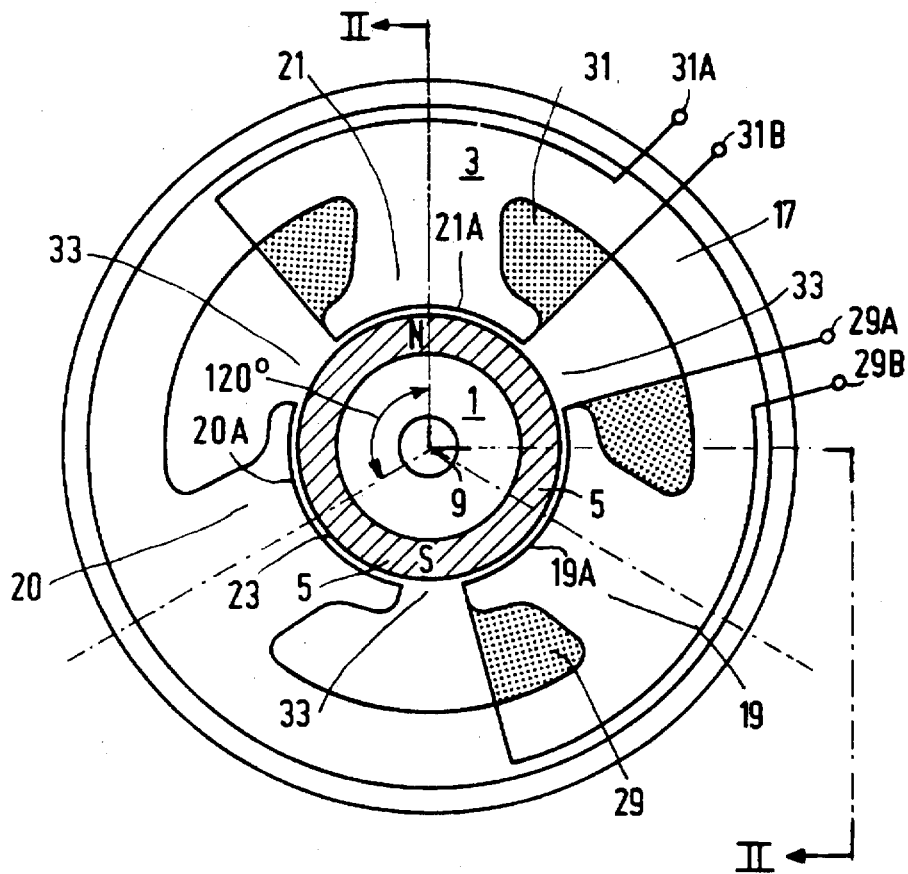
FIG. 1 is a cross-sectional view of an embodiment of the actuator in accordance with the invention.
Figure 2:
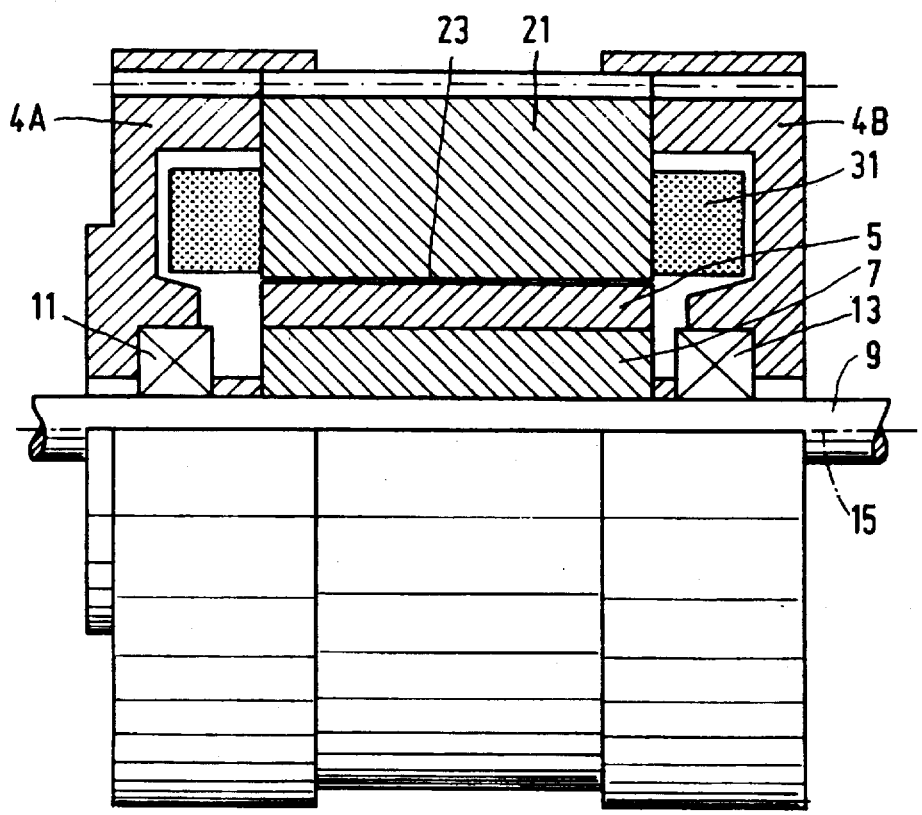
FIG. 2 is a longitudinal sectional view and a view taken on the line II—II in FIG. 1.
Figure 3:
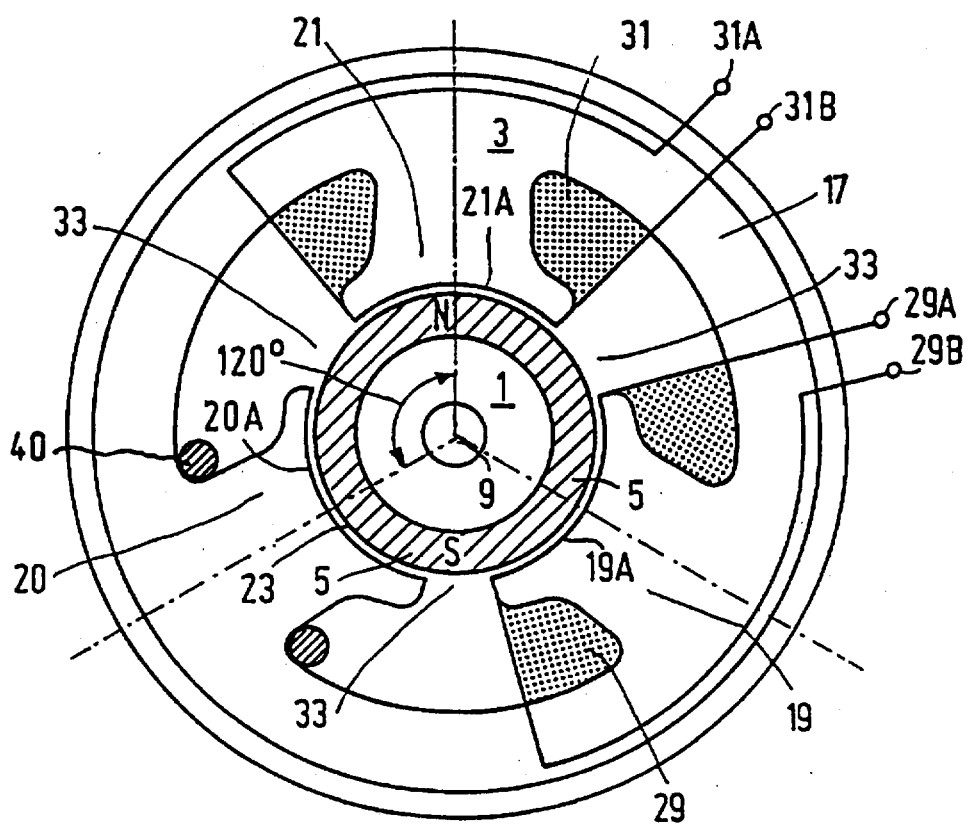
FIG. 3 is a cross-sectional view of a further embodiment of the actuator in accordance with the invention.

The actuator in accordance with the invention shown in FIG. 1 comprises a first actuator body 1, a second actuator body 3 and a housing 4A and 4B. The first actuator body 1 is constructed as a cylindrical diametrically magnetized permanent magnet pivotal body 5 having a north pole N and a south pole S. The pivotal body 5 is secured to an actuator spindle 9 by means of a soft magnetic sleeve 7, for example, made of sintered iron, which spindle extends through two bearings 11 and 13 and is movable relative to the second actuator body 3 about a pivotal axis 15. The second actuator body 3 has a stator body 17 comprising three sintered-iron teeth 19, 20 and 21 which extend radially inwards. If desired, the stator body 17 can be manufactured by another method, for example by stacking laminations to form one lamination assembly.

The teeth 19, 20 and 21, hereinafter referred to as stator teeth, each comprise an arcuate tooth surface 19A, 20A and 21A respectively. The tooth surfaces are all disposed on the same imaginary circularly cylindrical surface and define an air gap 23 relative to the pivotal body 5. The three stator teeth 19, 20 and 21 are of identical shape and dimensions and have central axes extending at angles of 120° relative to one another, so that the stator body 17 may be regarded as an actuator member which is at least internally rotationally symmetrical. This, inter alia, enables the tangential passages 33 between the tooth surfaces 21A, 22A and 23A to be selected comparatively large. In the present example the tangential dimension of each of the tooth surfaces is substantially a quarter of the circumferential length of said circumferential surface.

Two of the three stator teeth, namely the teeth 19 and 21, are provided with an exciter coil 29 and 31 respectively. The coils 29 and 31 comprise a plurality of turns arranged around the teeth 19 and 21 and each comprise a pair of coil terminals 29A, 29B and 31A, 31B respectively, which may be interconnected inside the actuator. Since the passages 33 are comparatively large, it is comparative simple to arrange the turns on the teeth 19 and 21. The other stator tooth, namely the tooth 20, does not carry an exciter coil.

The actuator in accordance with the invention, constructed as described above, comprises three identical stator teeth, which is important in order to eliminate detent torques, and only two exciter coils, which results in a favourable ratio between the delivered torque and the electric power applied to the exciter coils. The actuator in accordance with the invention is very suitable for uses requiring a controlled pivotal movement of the first actuator body 1 relative to the second actuator body 3 through a limited angle, for example, through 130°.

For completeness sake it is to be noted that the stator tooth 20 which does not carry an exciter coil may be provided with a measurement coil, for example, for determining the position of the actuator spindle 9.

What is claimed is:

1. An electrical actuator for producing a high torque relative to the supplied electrical power, comprising a first at least substantially circularly cylindrical actuator body having two diametrically opposed magnetic poles;

a soft-magnet second actuator body which is coaxial with the first actuator body and which comprises three equidistantly spaced circumferential teeth which are substantially identical in shape and dimensions, each tooth having an arcuate tooth surface;

exciter coils;

the first actuator body and the second actuator body cooperating with each other via an air gap and being pivotable through a limited angle relative to one another about a pivotable axis; characterized in that two, and not more than two, of said three teeth are provided with turns to form the exciter coils;

an actuator spindle; and a soft magnetic sleeve within the first cylindrical actuator body for securing the first actuator to the spindle.

2. An electrical actuator for producing a high torque relative to the supplied electrical power, comprising a first pivotal circularly cylindrical diametrically magnetized actuator body having a north pole and a south pole whereby a sinusoidal magnetic field around its circumference is present;

a stationary soft-magnet second actuator body which is coaxial with the first actuator body and which comprises three equidistantly spaced circumferential stator teeth which are substantially identical in shape and dimensions, each tooth having an arcuate tooth surface;

an actuator spindle;

exciter coils;

the first actuator body and the second actuator body cooperating with each other via an air gap and being pivotable through a limited angle relative to one another about a pivotable axis;

two, and not more than two, of said three teeth being provided with turns to form the exciter coils; and the first actuator body being secured to the actuator spindle, which extends through a bearing construction and is movable relative to the second actuator body.

3. An electrical actuator as claimed in claim 2, wherein the tooth surfaces are all disposed on a same imaginary circularly cylindrical surface and a tangential dimension of each of the tooth surfaces is substantially a quarter of the circumferential length of said imaginary surface.

4. An electrical actuator as claimed in claim 2, wherein the stator tooth which is not provided with turns to form the exciter coils is provided with a measurement coil.

* * * * *